United States Patent [19]

Himeno et al.

[11] Patent Number: 5,290,931
[45] Date of Patent: Mar. 1, 1994

[54] WATER-INSOLUBLE NAPHTHALIC ACID IMIDE DYESTUFFS

[75] Inventors: Kiyoshi Himeno, Munakata; Toshio Hihara, Kitakyushu, all of Japan

[73] Assignee: Hoechst Mitsubishi Kasei Co., Ltd., Tokyo, Japan

[21] Appl. No.: 940,789

[22] Filed: Sep. 4, 1992

Related U.S. Application Data

[63] Continuation of Ser. No. 658,677, Feb. 21, 1991, abandoned.

[30] Foreign Application Priority Data

Feb. 21, 1990 [JP] Japan .................... 2-40302
Mar. 7, 1990 [JP] Japan .................... 2-56212

[51] Int. Cl.⁵ .............. C07D 401/14; C07D 403/14; C07D 413/14; C07D 471/22
[52] U.S. Cl. ........................ 544/112; 546/41; 544/113; 544/120; 544/122; 544/125; 544/182; 544/212; 544/218; 544/238; 544/298; 544/316; 544/319; 544/322; 544/326; 544/405
[58] Field of Search ............ 544/328, 125, 209, 212, 544/218, 238, 298, 322, 326, 319; 546/041

[56] References Cited

U.S. PATENT DOCUMENTS

| | | | |
|---|---|---|---|
| 1,935,945 | 11/1933 | Eckert et al. | 546/41 |
| 2,965,644 | 12/1960 | Eckert et al. | 546/41 |
| 3,031,252 | 4/1962 | Staeuble et al. | 544/209 |
| 3,183,231 | 5/1965 | Buell | 544/209 |
| 3,518,266 | 6/1970 | Häusermann et al. | 544/113 |
| 3,632,589 | 1/1972 | Mueller et al. | 546/41 |
| 3,741,971 | 6/1973 | Fuchs et al. | 546/47 |
| 3,748,330 | 7/1973 | Fuchs et al. | 544/198 |
| 3,812,051 | 5/1974 | Merkle et al. | 549/231 |
| 3,883,523 | 5/1975 | Parton | 544/209 |
| 3,888,862 | 6/1975 | Meininger et al. | 544/238 |
| 3,931,186 | 1/1976 | Fuchs et al. | 546/41 |
| 4,051,134 | 9/1977 | Friedrich et al. | 544/212 |

FOREIGN PATENT DOCUMENTS

| | | |
|---|---|---|
| 1569761 | 6/1970 | Fed. Rep. of Germany . |
| 1569737 | 9/1970 | Fed. Rep. of Germany . |
| 2089618 | 1/1972 | France . |
| 2144737 | 2/1973 | France . |
| 250052 | 12/1985 | Japan . |
| 1391324 | 4/1975 | United Kingdom . |

OTHER PUBLICATIONS

Chem. Abstr. 104: 208, 328 of JP-60-250,052 to Niwa et al. published Dec. 10, 1985.
Chem. Abstr. 78: 59, 785 ofo DE 2,122,975 to Hoechst published Nov. 1972.

Primary Examiner—Nicholas S. Rizzo
Assistant Examiner—Matthew V. Grumbling
Attorney, Agent, or Firm—Oblon, Spivak, McClelland, Maier & Neustadt

[57] ABSTRACT

Water-insoluble naphthalic acid imide dyestuffs of the following formula:

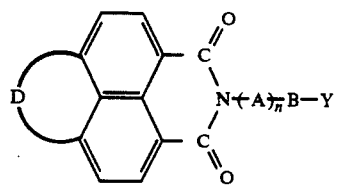

wherein D is

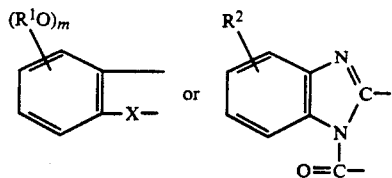

wherein $R^1$ is $C_1$-$C_8$ alkyl which may be substituted, $R^2$ is hydrogen, halogen, lower alkyl, lower alkoxy or cyano, X is oxygen or sulfur, and m is 0 or 1; A is phenylene, alkylene, aralkylene or $-C_2H_4OC_2H_4-$; B is oxygen, sulfur or

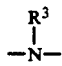

wherein $R^3$ is hydrogen or lower alkyl; Y is a 6-membered nitrogen-containing heterocyclic ring having at least one active halogen atom; and n is 0 or 1.

17 Claims, No Drawings

WATER-INSOLUBLE NAPHTHALIC ACID IMIDE DYESTUFFS

This application is a Continuation-in-part of application Ser. No. 07/658,677, filed on Feb. 21, 1991, now abandoned.

The present invention relates to water-insoluble naphthalic acid imide dyestuffs having fluorescence. More particularly, it relates to water-insoluble reactive dyestuffs which are capable of dyeing not only polyester and triacetate fibers but also nitrogen-containing fibers including polyurethane fibers and polyamide fibers such as nylon, silk and wool with a fluorescent clear greenish yellow or orange color.

Heretofore, for dyeing nylon or polyurethane fibers, it has been common to employ acid dyestuffs or metal-containing dyestuffs. However, in dyed products thereby obtained, the dyestuffs are fixed to fibers by ionic bond and there has been a general tendency that the washing fastness is low. It is also known to dye such fibers by means of a reactive dyestuffs. In this case, however, the dyeing properties tend to be inadequate although the washing fastness may be satisfactory, and such a method is not practically employed very much.

On the other hand, reflecting diversification of fibers in recent years, there have been many cases in which nylon or polyurethane fibers are used in combination with polyester or triacetate fibers in the form of a fiber mixture. However, the above mentioned acid dyestuffs, metal-containing dyestuffs and reactive dyestuffs are all water-soluble dyestuffs and as such, unable to dye polyester or triacetate fibers.

In recent years, dyestuffs having fluorescence are desired. However, there have been few dyestuffs which are capable of dyeing nylon or polyurethane fibers with fluorescent colors.

Under these circumstances, the present inventors have conducted various studies with an aim to obtain dyestuffs which are capable of dyeing nitrogen-containing fibers such as nylon or polyurethane and polyester or triacetate fibers simultaneously and which provides dyed products having excellent washing fastness. As a result, they have found that dyestuffs having a water-insoluble compound composed of a certain specific naphthalic acid imide derivative as the matrix and having a certain specific 6-membered heterocyclic ring with at least one active halogen atom bonded thereto, are capable of dyeing both fibers and yet capable of providing dyed products having excellent fastness and fluorescent greenish yellow or orange colors.

The present invention provides water-insoluble naphthalic acid imide dyestuffs of the following formula:

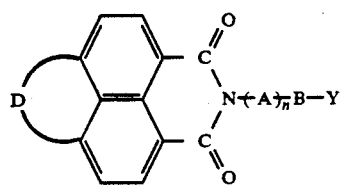

wherein D is

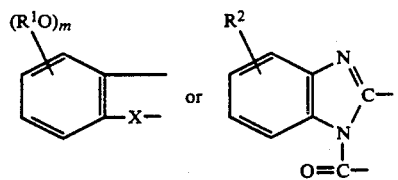

wherein $R^1$ is $C_1$–$C_8$ alkyl which may be substituted, $R^2$ is hydrogen, halogen, lower alkyl, lower alkoxy or cyano, X is oxygen or sulfur, and m is 0 or 1; A is phenylene, alkylene, aralkylene or —$C_2H_4OC_2H_4$—; B is oxygen, sulfur or

wherein $R^3$ is hydrogen or lower alkyl; Y is a 6-membered nitrogen-containing heterocyclic ring having at least one active halogen atom; and n is 0 or 1.

Now, the present invention will be described in detail with reference to the preferred embodiments.

The dyestuffs of the present invention are basically water-insoluble and of the same kind as disperse dyestuffs which have been used for polyester fibers. However, the dyestuffs of the present invention further have reactive groups in their structures, which are reactive with nitrogen-containing fibers. Thus, the dyestuffs of the present invention belong to the category of so-called "reactive disperse dyestuffs".

In the above formula (I), D is a substituent of the formula:

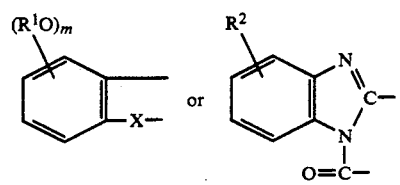

In this substituent, the $C_1$–$C_8$ alkyl for $R^1$ may, for example, be methyl, ethyl, straight chain or branched chain propyl, butyl, pentyl, hexyl, heptyl or octyl. Particularly preferred is $C_1$–$C_3$ alkyl. Such alkyl may be a substituted alkyl, for example, $C_1$–$C_4$ alkoxy $C_1$–$C_4$ alkyl such as metoxyethyl, ethoxyethyl, butoxyethyl or butoxypropyl, or hydroxy $C_1$–$C_4$ alkyl such as hydroxyethyl or hydroxybutyl. However, non-substituted alkyl is preferred. X is oxygen or sulfur. Particularly preferred is oxygen. Further, m is 0 or 1. Particularly preferred is 1. $R^2$ is hydrogen, halogen, lower alkyl, lower alkoxy or cyano. Here, the halogen may usually be fluorine, chlorine or bromine. Particularly preferred is chlorine. The carbon number of the lower alkyl and lower alkoxy for $R^2$ is usually from 1 to 4. Among them, methyl and methoxy are preferred. With respect to the position at which the substituent $R^2$ is introduced, it is usually impossible to introduce the substituent at a predetermined single position in view of the synthesis of the compound. Therefore, when $R^2$ is other than hydrogen, the compound of the present invention is usually a mixture of isomers having $R^2$ introduced at different positions.

A is phenylene, alkylene, aralkylene or —C₂H₄OC₂H₄—. The alkylene for A may usually be a straight chain or branched chain alkylene group such as methylene, ethylnene, n-propylene, iso-propylene, iso-butylene, n-butylene or n-hexylene. Particularly preferred among them is $C_1$-$C_3$ alkylene. The aralkylene for A may, for example be

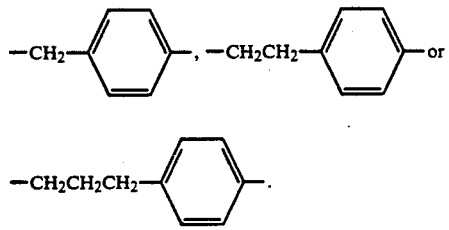

Particularly preferred as A is alkylene. Further, n is 0 or 1. Particularly preferred is 1.

B is oxygen, sulfur or

wherein $R^3$ is hydrogen, or $C_1$-$C_4$ lower alkyl such as methyl, ethyl or propyl. Particularly preferred as B is oxygen.

Y is a 6-membered nitrogen-containing heterocyclic ring having at least one active halogen atom. This heterocyclic ring is preferably a heterocyclic ring having 2 or 3 nitrogen atoms such as triazine, pyrimidine or pyridazine. The active halogen atoms include fluorine, chlorine and bromine. There is no particular restriction as to the number of such halogen atoms. However, it is usually preferred that one or two chlorine or fluorine atoms are directly substituted on the heterocyclic ring. Further, the heterocyclic ring may have a substituent other than the active halogen atoms, such as $C_1$-$C_4$ alkyl, $C_1$-$C_4$ alkoxy, amino which may be substituted, cyano, $C_1$-$C_4$ alkyl sulfonyl or morpholino. The substituent for the substituted amino may be alkyl, alkoxyalkyl, alkoxyalkoxyalkyl, alkenyl, aryl or aralkyl. Specific examples of Y wherein the nitrogen-containing heterocyclic ring is a triazine ring, include those represented by the following formulas:

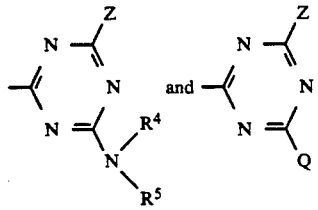

In the above formulas, Z is halogen such as fluorine, chlorine or bromine. Particularly preferred is fluorine or chlorine. Each of $R^4$ and $R^5$ which are independent from each other, is hydrogen, alkyl which may be substituted by cyano, hydroxyl, lower alkoxy, lower alkoxy lower alkoxy or dialkylamino, alkenyl, cyclohexyl, aryl or aralkyl or —NR⁴R⁵ represents a 5-memberd or 6-membered nitrogen-containing heterocyclic ring formed by the linkage of $R^4$ and $R^5$, provided that the total number of carbon atoms of $R^4$ and $R^5$ is not higher than 18.

Q may be the same halogen as Z, lower alkyl such as methyl or ethyl, phenyl, lower alkyl sulfonyl such as methyl sulfonyl, —OR⁶ or —SR⁶ wherein $R^6$ is lower alkyl such as methyl or ethyl, lower alkoxy lower alkoxy such as ethoxyethoxy, or phenyl.

The alkyl for $R^4$ and $R^5$ is preferably $C_1$-$C_8$ unsubstituted alkyl such as methyl, ethyl, straight chain or branched chain propyl, butyl, pentyl, hexyl, heptyl, or octyl, or $C_1$-$C_8$ alkyl substituted by $C_1$-$C_4$ alkoxy or $C_1$-$C_4$ alkoxy $C_1$-$C_4$ alkoxy such as 3-methoxypropyl, ethoxyethyl, 3-ethoxypropyl, 3-propoxypropyl, 3-isopropoxypropyl, 3-butoxypropyl, butoxyethyl, 3-isobutoxypropyl, methoxyethoxyethyl or ethoxypropoxypropyl. The alkenyl may be $C_3$-$C_4$ alkenyl such as allyl. The aryl may be phenyl. The aralkyl may be benzyl or phenethyl. The

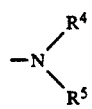

is preferably monoalkyl amino substituted by $C_1$-$C_4$ lower alkoxy.

Specific examples of Y wherein the nitrogen-containing heterocyclic ring is a pyrimidine ring or a pyridazine ring, include those represented by the following formulas:

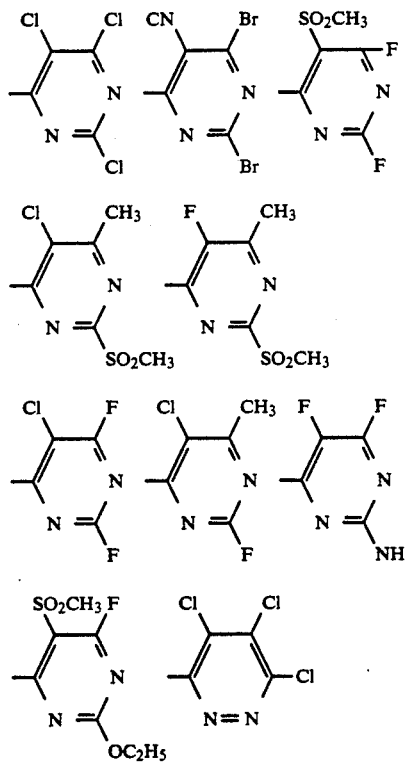

The 6-membered nitrogen-containing heterocyclic ring having at least one active halogen atom represented by Y is preferably the one wherein the heterocyclic ring is a triazine ring. Preferred as Y is the following substituent:

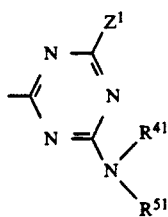

wherein $Z^1$ is fluorine or chlorine, and each of $R^{41}$ and $R^{51}$ which are independent from each other, is hydrogen, or $C_1$-$C_8$ alkyl which may be substituted by $C_1$-$C_4$ alkoxy or $C_1$-$C_4$ alkoxy $C_1$-$C_4$ alkoxy, alkenyl, aryl or aralkyl or —$NR^{41}R^{51}$ is a 6-membered nitrogen-containing heterocyclic ring formed by the linkage of $R^{41}$ and $R^{51}$.

Further, particularly preferred as Y is the following substituent:

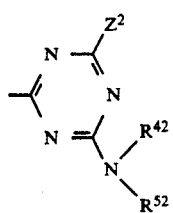

wherein $Z^2$ is fluorine or chlorine, and each of $R^{42}$ and $R^{52}$ which are independent from each other, is hydrogen, or $C_1$-$C_8$ alkyl which may be substituted by $C_1$-$C_4$ alkoxy or $C_1$-$C_4$ alkoxy $C_1$-$C_4$ alkoxy.

Among the dyestuffs of the above formula (I) of the present invention, particularly preferred are dyestuffs of the following formula (I-1) or (I-2):

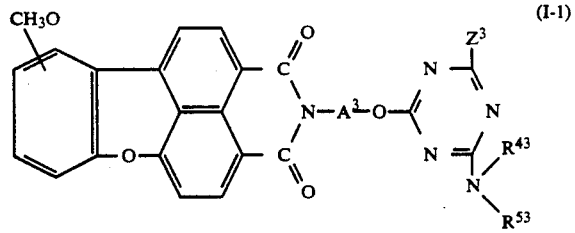

(I-1)

wherein $A^3$ is $C_1$-$C_3$ alkylene or aralkylene, $Z^3$ is fluorine or chlorine, and each of $R^{43}$ and $R^{53}$ which are independent from each other, is hydrogen, or $C_1$-$C_8$ alkyl which may be substituted by $C_1$-$C_4$ alkoxy or $C_1$-$C_4$ alkoxy $C_1$-$C_4$ alkoxy.

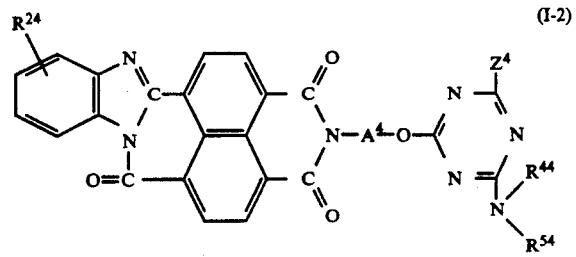

(I-2)

wherein $A^4$ is $C_1$-$C_3$ alkylene or aralkylene, $R^{24}$ is chlorine, methyl or methoxy, $Z^4$ is fluorine or chlorine, and each of $R^{44}$ and $R^{54}$ which are independent from each other, is hydrogen, or $C_1$-$C_8$ alkyl which may be substituted by $C_1$-$C_4$ alkoxy or $C_1$-$C_4$ alkoxy $C_1$-$C_4$ alkoxy.

The dyestuff of the formula (I) can readily be prepared by reacting a water-insoluble compound of the following formula (a):

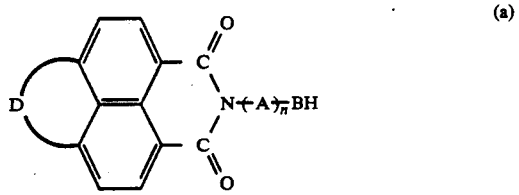

(a)

wherein D, A, B and n are as defined in the formula (I), with a heterocyclic compound of the following formula (b):

Hal—Y   (b)

wherein Hal is an active halogen atom, and Y is as defined above with respect to the formula (I). This reaction can be conducted by heating the compound of the formula (a) with from 1 to 1.2 molar times, relative to the compound of the formula (a), of the heterocyclic compound of the formula (b) in an organic solvent such as acetone, methyl ethyl ketone, toluene, nitrobenzene, dioxane, N,N-dimethylformamide, N-methyl-2-pyrrolidone or dimethylsulfoxide in the presence of from 1 to 2 molar times, relative to the compound of the formula (a), of an acid binder, for example, a tertiary amine such as triethylamine, tributylamine or N,N-diethylaniline, or an inorganic base such as potassium carbonate or potassium hydrogen carbonate, at a temperature of from 0 to 90° C. for from 0.5 to 5 hours. The resulting reaction solution is cooled and then put into water, whereupon the resulting precipitate is separated by a suitable method such as filtration or centrifugal separation to obtain a dyestuff of the formula (I) of the present invention substantially quantitatively.

The water-insoluble reactive dyestuff of the present invention are capable of dyeing not only nitrogen-containing fibers such as polyurethane fibers and polyamide fibers including nylon, silk and wool, but also polyester fibers and triacetate fibers. Accordingly, it is particularly suitable for use for dyeing a fiber mixture comprising (1) polyamide or polyurethane fibers and (2) polyester or triacetate fibers, which used to be very difficult to dye simultaneously. Further, the dyestuffs of the present invention are useful for dyeing almost all other fibers including cellulose fibers, viscous rayon, hemp, silk, and wool.

Further, the dyestuffs of the present invention are useful not only as dyes for dyeing fibers or fabrics but also as colorants for coloring paper or synthetic resins, or as coloring matters for an ink for an ink jet printer.

To carry out the dyeing by means of the dyestuff of the present invention, it is desirable to finely disperse the dyestuff of the formula (I) in a medium in a particle size of from 0.5 to 2 μm. This can be done by:

(1) a method of finely dispersing it in water by means of a pulverizer such as a sand grinder using a water-soluble dispersing agent such as a pluronic type non-ionic surfactant or an anionic dispersing agent such as sodium ligninsulfonate or a sodium salt of a naphthalene sulfonic acid-formaline condensation product;

(2) a method of finely dispersing it in an organic solvent such as an alcohol, a ketone, a hydrocarbon, a haloganated hydrocarbon, an ester, an ether or a mixture thereof, using a sulfosuccinic acid ester or a compound obtained by adding a small molar amount of ethylene oxide to e.g. nonyl phenol; or
(3) a method of finely dispersing it in a mixture comprising water and a solvent selected from the above mentioned solvents, which can optionally be mixed with water.

Further, during the process of finely dispersing the dyestuff as mentioned above, a polymer compound soluble in the respective dispersing medium or a surfactant or the like having a function other than the dispersing function, may also be incorporated.

As a method for dyeing fibers by means of this finely dispersed dye solution, a dip dyeing method, a padding dyeing method or a printing method may usually be employed. The dyeing conditions vary depending upon the fibers to be treated, but may usually be the conditions commonly employed for dyeing the respective fibers. For example, in a case where a fiber mixture of polyester and nylon is to be dyed by a dip dyeing method, the pH of the dye bath is from 5 to 7, and the temperature for dyeing is at a level of from 120 to 130° C. On the other hand, when cellulose fibers are to be dyed by a padding method, from 6 to 12%, based on the padding bath, of a cellulose fiber swelling agent is added to the padding bath, the pH of the bath is adjusted to a level of form 7 to 9, and the temperature for dyeing is adjusted to a level of from 120–220° C. Further, treatment after the dyeing may be conducted in accordance with a usual method, which includes soaping, washing with water and drying.

The dyestuffs of the present invention are capable of simultaneously dyeing polyester or triacetate fibers and nitrogen-containing fibers, and yet the resulting dyed products have fluorescent clear colors and being excellent in the washing fastness. Thus, it is very useful.

Now, the present invention will be described in further detail with reference to Examples. However, it should be understood that the present invention is by no means restricted to such specific Examples.

EXAMPLES 1

A mixture comprising 25 g of a dyestuff of the following structural formula:

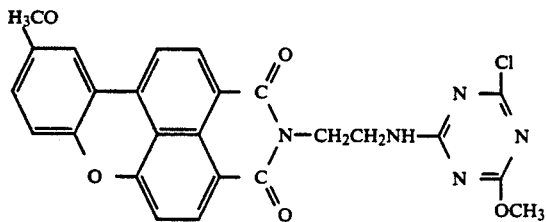

438 nm (solvent: dimethylformamide (hereinafter referred to as DMF))

25 g of a naphthalene sulfonic acid-formaldehyde condensation product and 50 ml of water, was finely dispersed by means of a sand grinder as a finely dispersing machine, to obtain a dye dispersion. Using this dye dispersion, a dye bath (pH 5.1) having the following composition:

| Dye dispersion | 1.5 g |
|---|---|
| Water | Rest |
|  | 200 ml | was prepared, and 10 g of a fine denier polyester/nylon blend cloth (blending ratio: 8/2) was dipped into the dye bath and gradually heated from room temperature to 130° C. and dyed at 130° C. for one hour.

Then, washing was conducted at 80° C. for 10 minutes at a bath ratio of 1:50 using a washing solution comprising 2 g/l of each of a nonionic surfactant (Diaserver® SC-CT 40, manufactured by Mitsubishi Kasei Corporation), sodium hydroxide and hydrosulfite, to obtain a dyed product having a fluorescent greenish yellow color. The obtained dyed product had a lightfastness of 4–5 grade (JIS L-0842, 20 hours), a washing fastness of 4–5 grade (JIS L- 844 Method A-2, stain to a nylon white cloth), and a water-fastness of 4–5 grade (JIS L-846 Method A, stain to a nylon white cloth) and thus was excellent in these properties.

The dyestuff used in this Example was prepared as follows:

3.3 g of a dyestuff of the following structural formula:

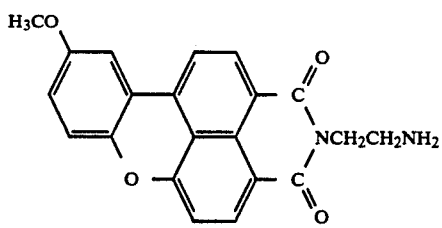

was dissolved in 50 ml of N methyl-2-pyrrolidone, and 2.0 g of 2,4 -dichloromethoxy-s-tiazine and 2.0 g of triethylamine were added thereto. The mixture was reacted at 40° C. for 2 hours. The reaction mixture was put into 1 l of iced water, and precipitated crystals were collected by filtration, washed with water and dried to obtain 4.4 g of yellow crystals. This dyestuff had $\lambda_{max}$ (DMF) at 438 nm.

EXAMPLE 2

A mixture comprising 250 g of a dyestuff of the following formula:

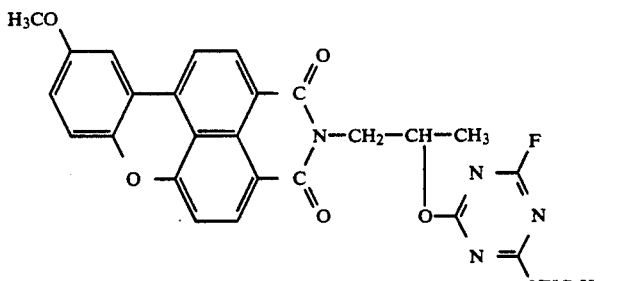

$\lambda_{max}$ 438 nm
(Solvent: DMF)

250 g of a naphthalene sulfonic acid-formaldehyde condensation product and 500 ml of water, was finely dispersed by means of a sand grinder as a finely dispersing machine, to obtain a dye dispersion.

Using this dye dispersion, a padding bath having the following composition:

| Dye dispersion | 50 g |
|---|---|
| Sodium acetate | 5 g |
| Water | Rest |
| | 1,000 g | was prepared, and a triacetate/nylon blend cloth was dipped in the bath, then squeezed at a squeezing rate of 65%, dried at 100° C. for 2 minutes, fixed at 180° C. for 7 minutes by a H. T. S. machine, followed by washing in the same manner as described in Example 1, to obtain a dyed cloth having a fluorescent greenish yellow color.

This dyed product had a light-fastness of 4 grade (JIS L-0842, 20 hours), a washing fastness of 4–5 grade (JIS L-844 Method A-2, stain to a nylon white cloth) and a water fastness of 4–5 grade (JIS L-846 Method of A, stain to a nylon white cloth) and thus was excellent in these properties.

EXAMPLE 3

A mixture comprising 25 g of a dyestuff of the following formula:

and 60 ml of water, was finely dispersed by means of a paint shaker as a finely dispersing machine, to obtain a dye dispersion.

Using this dispersion, a printing paste (pH 7.0) having the following composition:

| Dye dispersion | 80 g |
|---|---|
| O/W emulsion having sodium alginate as the base | 600 g |
| Sodium polyphosphate | 5 g |
| Water | Rest |
| | 1,000 g | was prepared, and a polyester/polyurethane blend cloth (blending ratio: 8/2) was subjected to screen printing by means of a screen printing machine, then subjected to intermediate drying at 80° C. for 3 minutes and thereafter fixed at 130° C. for 20 minutes by a H. P. S. machine. Then, washing was conducted in the same manner as described in Example 1 to obtain a printed cloth having a fluorescent greenish yellow color.

This printed cloth had a light-fastness of 4–5 grade (JIS L-0842, 20 hours), a washing fastness of 5 grade (JIS L-844 Method A-2, stain to a nylon white cloth) and a water fastness of 4 grade (JIS L-846 Method A, stain to a nylon white cloth) and thus was excellent in these properties.

EXAMPLE 4

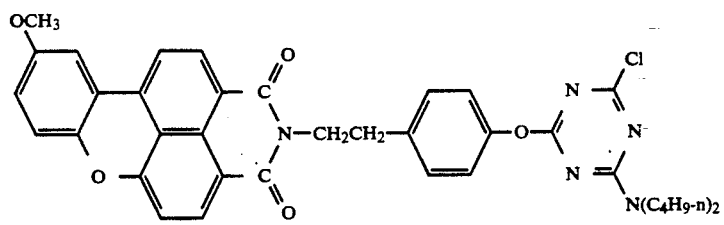

$\lambda_{max}$ 439 nm
(Solvent: DMF)

6 g of a nonionic dispersing agent (Newcol 710F, manufactured by Nippon Nyukazai K.K.), 4 g of a lignin sulfonic acid type anion dispersing agent (Reax 85 A, manufactured by West Veco), 5 g of propylene glycol A mixture comprising 25 g of a dyestuff of the following formula:

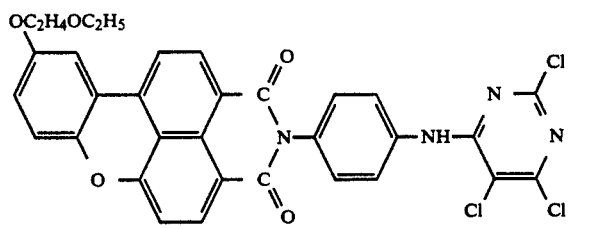

λ_max 445 nm
(Solvent: DMF)

25 g of a naphthalene sulfonic acid-formaldehyde condensation product and 50 ml of water, was finely dispersed by means of a sand grinder as a finely pulverizing machine, to obtain a dye dispersion.

Using this dye dispersion, a dye bath (pH 5.0) having the following composition:

| | |
|---|---|
| Dye dispersion | 1.5 g |
| p-Phenylphenol (used as a carrier) | 1.0 g |
| Water | Rest |
| | 200 ml | was prepared, and 10 g of a polyester/triacetate/wool blend cloth (blending ratio: 5/3/2) was dipped in the dye bath, then gradually heated from room temperature to 125° C. and dyed at this temperature for one hour.

Then, the dyed cloth was washed with water and then washed at a bath ratio of 1:50 using a washing solution containing 2 g/l of a nonionic surfactant (Diaserver ® SCCT-40, manufactured by Mitsubishi Kasei Corporation), to obtain a dyed product having a uniform fluorescent greenish yellow color.

This dyed cloth had a light-fastness of 4 grade (JIS L-0842, 20 hours) and a washing fastness of 5-grade (JIS L-844 Method A-2, stain to a wool white cloth) and thus was excellent in these properties.

EXAMPLE 5

A fine denier polyester/nylon blend cloth (blending ratio: 8/2) was dyed by means of a dyestuff as identified in the following Table 1 in accordance with Example 1, to obtain a dyed cloth having a color as identified in the same Table.

Each dyed product thereby obtained had excellent light fastness of at least 4 grade, and the washing fastness (stain to a nylon white cloth) was excellent at level of at least 4 grade.

TABLE 1

| NO. | $(R^1O)_m$ | —X— | $(A)_n$ | —B— | —Y | $\lambda_{max}$ (solvent: DMF) nm | Color |
|---|---|---|---|---|---|---|---|
| 5-1 | $H_5C_2O$-[phenyl] | —O— | — | —NH— | [pyrimidine with Cl, N, N, NHC$_{18}$H$_{37(n)}$] | 436 | Fluorescent greenish yellow |
| 5-2 | $H_7C_3O$ (n)-[phenyl] | —O— | —CH$_2$—CH—CH$_3$— | —O— | [pyrimidine with F, N, N, Cl, F] | 438 | Fluorescent greenish yellow |
| 5-3 | $H_3CO$-[phenyl] | —O— | —C$_4$H$_8$— | —O— | [pyrimidine with Br, N, N, CN, Br] | 440 | Fluorescent greenish yellow |

TABLE 1-continued

Structure:
(R¹O)$_m$–Ar–[naphthalimide core with X bridge]–N(–A$_n$–B–Y) with two C=O groups

| NO. | (R¹O)$_m$ on phenyl | –X– | –(A)$_n$– | –B– | –Y | $\lambda_{max}$ (solvent: DMF) nm | Color |
|---|---|---|---|---|---|---|---|
| 5-4 | H$_3$CO– (on dimethylphenyl) | –O– | –C$_2$H$_4$– | –N(CH$_3$)– | 4-chloro-6-methyl-2-morpholino-1,3,5-triazinyl | 439 | Fluorescent greenish yellow |
| 5-5 | H$_3$CO– | –O– | –CH$_2$CH$_2$CHCH$_3$– | –O– | 4-chloro-6-methyl-2-[N(C$_2$H$_4$OC$_2$H$_5$)(C$_2$H$_4$OCH$_3$)]-1,3,5-triazinyl | 438 | Fluorescent greenish yellow |
| 5-6 | H$_3$CO– | –O– | –C$_3$H$_6$– | –NH– | 2,5-dichloro-4-(SO$_2$CH$_3$)-pyrimidinyl | 439 | Fluorescent greenish yellow |
| 5-7 | H$_9$C$_4$OH$_4$C$_2$O– (n) | –O– | –C$_2$H$_4$– | –N(C$_3$H$_7$(n))– | 3,4,5-trichloropyridazin-6-yl (N=N) | 438 | Fluorescent greenish yellow |
| 5-8 | H$_3$CO– | –S– | –CH$_2$–(p-phenylene)– | –NH– | 4-chloro-6-methyl-2-amino-1,3,5-triazinyl | 448 | Fluorescent greenish yellow |
| 5-9 | H$_3$CO– | –O– | –C$_3$H$_6$– | –O– | 4-chloro-6-methyl-2-(NHCH$_2$CH=CH$_2$)-1,3,5-triazinyl | 438 | Fluorescent greenish yellow |
| 5-10 | (methylphenyl) | –S– | –C$_4$H$_8$– | –O– | 4-bromo-6-methyl-2-(NHCH$_2$CH$_2$–phenyl)-1,3,5-triazinyl | 440 | Fluorescent greenish yellow |

TABLE 1-continued

| NO. | (R¹O)ₘ structure | —X— | ―(A)ₙ― | —B— | —Y | λmax (solvent: DMF) nm | Color |
|---|---|---|---|---|---|---|---|
| 5-11 | H₃CO— | —S— | —CH₂— | —O— | pyrimidine with SO₂CH₃, F, CH₃ | 427 | Fluorescent greenish yellow |
| 5-12 | H₉C₄O (t) | —O— | —C₅H₁₀— | —O— | triazine with F, NH-phenyl | 438 | Fluorescent greenish yellow |
| 5-13 | H₃CO | —O— | —C₂H₄OC₂H₄— | —O— | triazine with F, NHC₃H₇(n) | 435 | Fluorescent greenish yellow |

EXAMPLE 6

A mixture comprising 25 g of a dyestuff of the following structural formula:

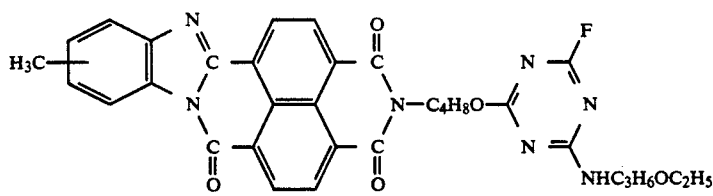

25 g of a naphthalene sulfonic acid-formaldehyde condensation product and 50 ml of water, was finely pulverized by means of a sand grinder as a finely dispersing machine, to obtain a dye dispersion.

Using this dye dispersion, a dye bath (pH 5.1) having the following composition:

| Dye dispersion | 1.5 g |
|---|---|
| Water | Rest |
| | 200 ml | was prepared, and 10 g of a fine denier polyester/nylon blend cloth (blending ratio: 8/2) was dipped in the dye bath, then gradually heated from room temperature to 130° C. and dyed at that temperature for one hour.

Then, washing was conducted at 80° C. for 10 minutes at a bath ratio of 1:50 using a washing solution containing 2 g/l of each of a nonionic surfactant (Diaserver ® SC-CT 40, manufactured by Mitsubishi Kasei Corporation), sodium hydroxide and hydrosulfite, to obtain a dyed product having a fluorescent orange color. This dyed product had a washing fastness of 4-5 grade (JIS L-844 Method A-2, stain to a nylon white cloth) and a water fastness of 4-5 grade (JIS L-846 Method A, stain to a nylon white cloth) and thus was excellent in these properties.

The dyestuff used in this Example was prepared as follows:

5.9 g of a dyestuff of the following naphthalic acid imide compound:

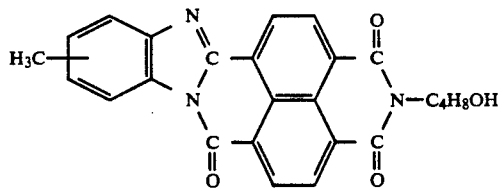

was dissolved in 80 ml of N-methyl-2-pyrrolidone, and the solution was cooled to −5° C. Then, 1.4 g of trifluorotriazine was gradually added thereto, and the mixture was stirred for 30 minutes. Then, 1.0 g of triethylamine was added thereto, and the mixture was stirred at a temperature of from −5° C. to 0° C. for 2 hours. Further, 1.0 g of ethoxypropylamine was added thereto at the same temperature and reacted for 30 minutes. After completion of the reaction, the reaction product was put into 1 l of ice water. Precipitated crystals were collected by filtration, washed with water and dried to obtain 7.5 g of orange color crystals. This dyestuff had $\lambda_{max}$ (solvent: acetone) at 431nm.

EXAMPLE 7

A mixture comprising 250 g of a dyestuff of the following formula:

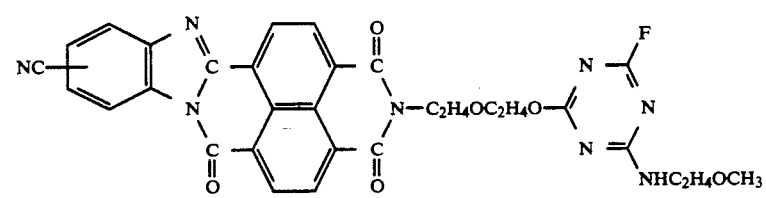

$\lambda_{max}$ (solvent: acetone) 416 nm 250 g of a naphthalenesulfonic acid-formaldehyde condensation product and 500 ml of water, was finely dispersed by means of a sand grinder as a finely dispersing machine, to obtain a dye dispersion.

Using this dye dispersion, a padding bath having the following composition:

| Dye dispersion | 50 g |
|---|---|
| Sodium acetate | 5 g |
| Water | Rest |
| | 1,000 g | was prepared, and a triacetate/nylon blend cloth was dipped in the bath, then squeezed at a squeezing rate of 65%, dried at 100° C. for 2 minutes, fixed at 180° C. for 7 minutes by a H. T. S. machine, followed by washing in the same manner as described in Example 6, to obtain a dyed cloth having a fluorescent greenish yellow color.

The washing fastness (JIS L-844 Method A-2, stain to a nylon white cloth) of this dyed product was excellent at a level of 4–5 grade. Further, the water fastness (JIS L-846 Method A, stain to a nylon white cloth) was also excellent at a level of 4–5 grade.

EXAMPLE 8

A mixture comprising 25 g of a dyestuff of the following formula:

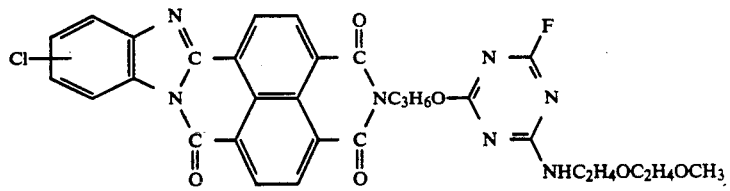

$\lambda_{max}$ (solvent: acetone) 420 nm 6 g of a nonionic dispersing agent (Newcol 710F, manufactured by Nippon NyukaZai K.K.), 4 g of a lignin sulfonic acid type anion dispersing agent (Reax 85 A, manufactured by West Veco), 5 g of propylene glycol and 60 ml of water, was finely dispersed by means of a paint shaker as a finely dispersing machine, to obtain a dye dispersion.

Using this dispersion, a printing paste (pH 7.0) having the following composition:

| Dye dispersion | 80 g |
|---|---|
| O/W emulsion having sodium alginate as the base | 600 g |
| Water | Rest |
| | 1,000 g | was prepared, and a polyester/polyurethane blend cloth (blending ratio: 8/2) was subjected to screen printing by means of a screen printing machine, then subjected to intermediate drying at 100° C. for 3 minutes and thereafter fixed at 130° C. for 20 minutes by a H. P. S. machine. Then, washing was conducted in the same manner as described in Example 6 to obtain a printed cloth having a fluorescent yellow color.

The washing fastness (JIS L-844 Method A-2, stain to a nylon white cloth) of this dyed cloth was excellent at a level of 4–5 grade.

EXAMPLE 9

A mixture comprising 25 g of a dyestuff of the following formula:

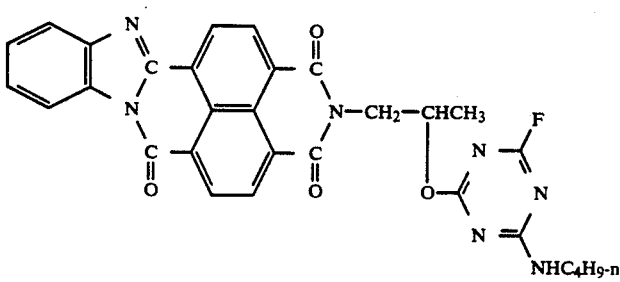

$\lambda_{max}$ (solvent: acetone) 430 nm 25 of a naphthalene sulfonic acid-formaldehyde condensation product and 50 ml of water, was finely dispersed by means of a sand grinder as a finely pulverizing machine, to obtain a dye dispersion.

Using this dye dispersion, a dye bath (pH 5.0) having the following composition:

| | |
|---|---|
| Dye dispersion | 1.5 g |
| p-Phenylphenol (used as a carrier) | 1.0 g |
| Water | Rest |
| | 200 ml | was prepared, and 10 g of a polyester/triacetate/wool blend cloth (blending ratio: 5/3/2) was dipped in the dye bath, then gradually heated from room temperature to 125° C. and dyed at this temperature for one hour.

Then, the dyed cloth was washed with water and then washed at a bath ratio of 1:50 using a washing solution containing 2 g/l of a nonionic surfactant (Diaserver® SCCT-40, manufactured by Mitsubishi Kasei Corporation), to obtain a dyed product having a fluorescent orange color.

The washing fastness (JIS L-844 Method A-2, stain to a wool white cloth) of this dyed product was excellent at a level of 5 grade.

EXAMPLE 10

A fine denier polyester/nylon blend cloth (blending ratio: 8/2) was dyed by means of a dyestuff as identified in Table 2 in accordance with Example 6, to obtain a dyed cloth having a color as identified in Table 2. The washing fastness (JIS L-844 Method A-2, stain to a nylon white cloth) of each dyed product was excellent at a level of at least 4 grade.

TABLE 2

| No. | $-R^2$ | $-A-$ | $-Z$ | $-N\begin{smallmatrix}R^4\\R^5\end{smallmatrix}$ | $\lambda_{max}$ (solvent: acetone) nm | Color |
|---|---|---|---|---|---|---|
| 10-1 | $-C_4H_{9(n)}$ | $-C_2H_4-$ | $-F$ | $-NHC_6H_{13(sec)}$ | 435 | Fluorescent orange |
| 10-2 | $-CH_3$ | $-C_6H_{12}-$ | $-F$ | $-NHC_3H_6OC_3H_{7(i)}$ | 436 | Fluorescent orange |
| 10-3 | $-Br$ | $-C_4H_8-$ | $-Cl$ | $-NHC_8H_{17(n)}$ | 421 | Fluorescent yellow |
| 10-4 | $-OCH_3$ | $-C_2H_4OC_2H_4-$ | $-F$ | $-N\begin{smallmatrix}C_2H_4OC_2H_5\\C_2H_4OC_2H_5\end{smallmatrix}$ | 448 | Fluorescent orange |
| 10-5 | $-CH_3$ | $-C_2H_4OC_2H_4-$ | $-F$ | $-NHC_2H_4OC_4H_{9(n)}$ | 432 | Fluorescent orange |
| 10-6 | $-C_2H_5$ | $-C_3H_6-$ | $-Br$ | $-N\begin{smallmatrix}CH_3\\CH_3\end{smallmatrix}$ | 434 | Fluorescent orange |

EXAMPLE 11

A fine denier polyester/nylon blend cloth (blending ratio: 8/2) was dyed by means of a dyestuff as identified in Table 3 in accordance with Example 6, to obtain a dyed cloth having a color as identified in Table 3. The washing fastness (JIS L-844 Method A-2, stain to a nylon white cloth) of each dyed product thus obtained was excellent at a level of at least 4 grade.

TABLE 3

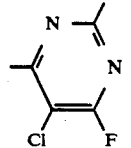

| NO. | —R² | ─(A)ₙ─ | —B— | —Y | λmax (solvent: DMF) nm | Color |
|---|---|---|---|---|---|---|
| 11-1 | —CH₃ | 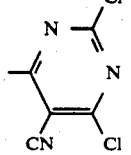—C₂H₄— | —O— | (F, Cl, F pyrimidine) | 434 | Fluorescent orange |
| 11-2 | —Br | —C₃H₆— | —O— | (Cl, CN, Cl pyrimidine) | 420 | Fluorescent yellow |
| 11-3 | —C₄H₉(n) | (phenylene) | —O— | (SO₂CH₃, F, CH₃ pyrimidine) | 429 | Fluorescent orange |
| 11-4 | —C₂H₅ | —C₄H₈— | —N(CH₃)— | (Cl, Cl, Cl, Cl pyridazine N=N) | 430 | Fluorescent orange |
| 11-5 | —OCH₃ | —C₂H₄— | —S— | (Cl, Cl, SO₂CH₃ pyrimidine) | 445 | Fluorescent orange |
| 11-6 | —CN | —C₂H₄OC₂H₄— | —O— | (F, Cl, F pyrimidine) | 413 | Fluorescent orange |

What is claimed is:

1. Water insoluble naphthalic acid imide dyestuffs for dyeing a fiber mixture comprising (i) polyamide or polyurethane fibers and (ii) polyester or triacetate fibers of the following formula:

(I)

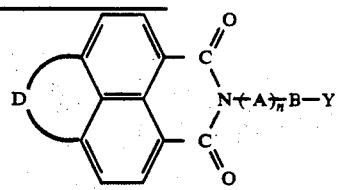

wherein D is

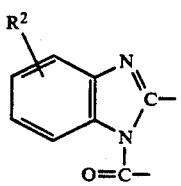

wherein $R^2$ is hydrogen, halogen, lower alkyl, lower alkoxy or cyano, A is phenylene, alkylene, aralkylene or $-C_2H_4OC_2H_4-$; B is oxygen, sulfur or

wherein $R^3$ is hydrogen or lower alkyl; Y is a 6-membered nitrogen-containing heterocyclic ring having at least one active halogen atom; and n is 0 or 1.

2. The dyestuffs according to claim 1, wherein A is phenylene, $C_1$-$C_6$ alkylene, aralkylene or $-C_2H_4OC_2H_4-$.

3. The dyestuffs according to claim 1, wherein A is $C_1$-$C_6$ alkylene.

4. The dyestuffs according to claim 1, wherein A is $C_1$-$C_3$ alkylene.

5. The dyestuffs according to claim 1, wherein A is aralkylene.

6. The dyestuffs according to claim 1, wherein n is 1.

7. The dyestuffs according to claim 1, wherein B is oxygen.

8. The dyestuffs according to claim 1, wherein Y is a 6-membered nitrogen-containing heterocyclic ring having at least one active halogen atom, which may be substituted by $C_1$-$C_4$ alkyl, $C_1$-$C_4$ alkoxy, $C_1$-$C_4$ alkyl sulfonyl, cyano, morpholino or amino which may be substituted by alkyl, alkoxyalkyl, alkoxyalkoxyalkyl, alkenyl, aryl or aralkyl.

9. The dyestuffs according to claim 1, wherein Y is a triazine, pyrimidine or pyridazine ring having at least one active halogen atom.

10. The dyestuffs according to claim 1, wherein Y is a triazine or pyrimidine ring having at least one active halogen atom.

11. The dyestuffs according to claim 1, wherein the active halogen atom in Y is fluorine or chlorine.

12. The dyestuffs according to claim 1, wherein Y is a substituent of the following formula:

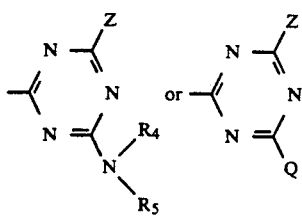

wherein Z is halogen, each of $R^4$ and $R^5$ which are independent from each other, is hydrogen, alkyl which may be substituted by cyano, hydroxy, lower alkoxy, lower alkoxy lower alkoxy or dialkyl amino, alkenyl, cyclohexyl, aryl or aralkyl or $-NR^4R^5$ represents a 5—or 6-membered nitrogen-containing heterocyclic ring formed by the linkage of $R^4$ and $R^5$, Q is halogen, lower alkyl, phenyl, lower alkyl sulfonyl, $-OR^6$ or $-SR^6$ wherein $R^6$ is lower alkyl, lower alkoxy lower alkoxy or phenyl.

13. The dyestuffs according to claim 1, wherein Y is a substituent of the following formula:

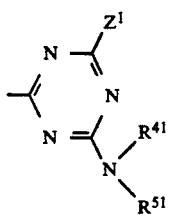

wherein $Z^1$ is fluorine or chlorine, each of $R^{41}$ and $R^{51}$ which are independent from each other, is hydrogen, $C_1$-$C_8$ alkyl which may be substituted by $C_1$-$C_4$ alkoxy or $C_1$-$C_4$ alkoxy $C_1$-$C_4$ alkoxy, alkenyl, aryl or aralkyl or $-NR^{41}R^{51}$ represents a 6-membered nitrogen-containing heterocyclic ring formed by the linkage of $R^{41}$ and $R^{51}$.

14. The dyestuffs according to claim 1, wherein Y is a substituent of the following formula:

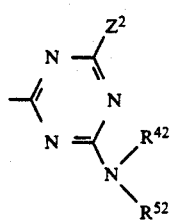

wherein $Z^2$ is fluorine or chlorine, and each of $R^{42}$ and $R^{52}$ which are independent from each other, is hydrogen, or $C_1$-$C_8$ alkyl which may be substituted by $C_1$-$C_4$ alkoxy or $C_1$-$C_4$ alkoxy $C_1$-$C_4$ alkoxy.

15. The dyestuffs according to claim 1, wherein $R^2$ is hydrogen, halogen, $C_1$-$C_4$ alkyl, $C_1$-$C_4$ alkoxy or cyano.

16. The dyestuffs according to claim 1, wherein $R^2$ is chlorine, methyl or methoxy.

17. The dyestuffs according to claim 1, which are represented by the following formula:

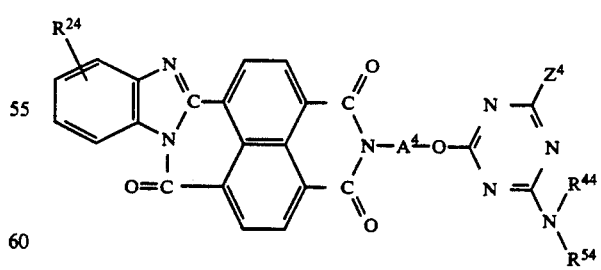

wherein $A^4$ is $C_1$-$C_3$ alkylene or aralkylene; $R^{24}$ is chlorine, methyl or methoxy; $Z^4$ is fluorine or chlorine; and each of $R^{44}$ and $R^{54}$ which are independent from each other, is hydrogen, or $C_1$-$C_8$ alkyl which may be substituted by $C_1$-$C_4$ alkoxy or $C_1$-$C_4$ alkoxy $C_1$-$C_4$ alkoxy.

* * * * *